United States Patent [19]

Burström

[11] Patent Number: 4,906,125
[45] Date of Patent: Mar. 6, 1990

[54] DEVICE FOR THE PRODUCTION OF A LOCKING OR BRAKING EFFECT BETWEEN TWO ELEMENTS

[76] Inventor: Bertil Burström, Boarp 790, 26200 Ängelholm, Sweden

[21] Appl. No.: 30,856
[22] PCT Filed: Jun. 6, 1986
[86] PCT No.: PCT/SE86/00269
    § 371 Date: Feb. 9, 1987
    § 102(e) Date: Feb. 9, 1987
[87] PCT Pub. No.: WO86/07420
    PCT Pub. Date: Dec. 18, 1986

[30] Foreign Application Priority Data
Jun. 7, 1985 [SE] Sweden ............................. 8502812

[51] Int. Cl.⁴ ................................................. F16D 1/06
[52] U.S. Cl. ...................................... 403/370; 403/372
[58] Field of Search ............ 403/365, 372, 371, 368, 403/326, 291, 370, 259, 261, 256, 249, 243, 195, 197, 277, 280

[56] References Cited

U.S. PATENT DOCUMENTS

| | | | |
|---|---|---|---|
| 2,798,748 | 7/1957 | Maurer | 403/372 |
| 3,888,598 | 6/1975 | Samiran et al. | 403/372 |
| 3,995,967 | 12/1976 | Haller | 403/372 X |
| 4,025,214 | 5/1977 | Spieth | 403/370 |
| 4,480,490 | 11/1984 | Inoue | 403/368 X |
| 4,514,109 | 4/1985 | McKenna | 403/365 X |
| 4,555,199 | 11/1985 | Maier et al. | 403/370 |
| 4,646,897 | 3/1987 | Winters | 403/326 X |
| 4,712,811 | 12/1987 | Wier | 403/371 X |
| 4,726,704 | 2/1988 | Martins | 403/372 |

FOREIGN PATENT DOCUMENTS 2715418 10/1978 Fed. Rep. of Germany ...... 403/371

*Primary Examiner*—Randolph A. Reese
*Assistant Examiner*—Peter M. Cuomo
*Attorney, Agent, or Firm*—Browdy and Neimark

[57] ABSTRACT

A device for the production of a locking or braking effect between two elements, such as a shaft (20) and a hub (21), which display two concentric, cylindrical surfaces, which device includes a sleeve, made in one piece, for axial insertion between the surfaces. The sleeve is circumferentially divided into sleeve sections, which are separated by, at least partially, axially directed rows of holes in the body wall of the sleeve, and which are connected to each other by bridges, formed of the remaining wall material between the holes in the said rows. The body wall is provided with weak zones, designed to, through compression, project radially inwards and outwards into engagement with the said surfaces in order to achieve the locking and braking effect. Circumferentially adjacent sleeve sections are designed to be displaced axially in relation to each other, in order to produce compressive forces upon the bridges, which thereby undergo such a change of position and/or form that the forces which produce the compression of the weak zones are then produced in the sleeve.

10 Claims, 2 Drawing Sheets

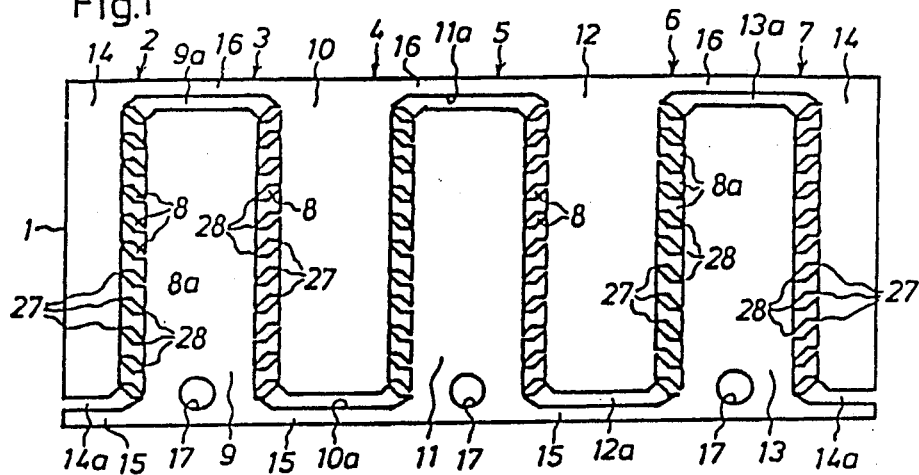
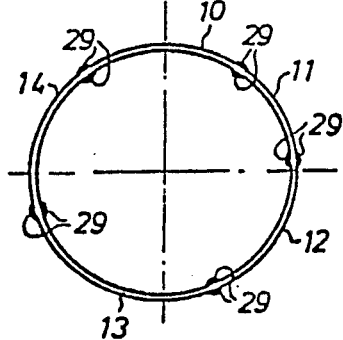
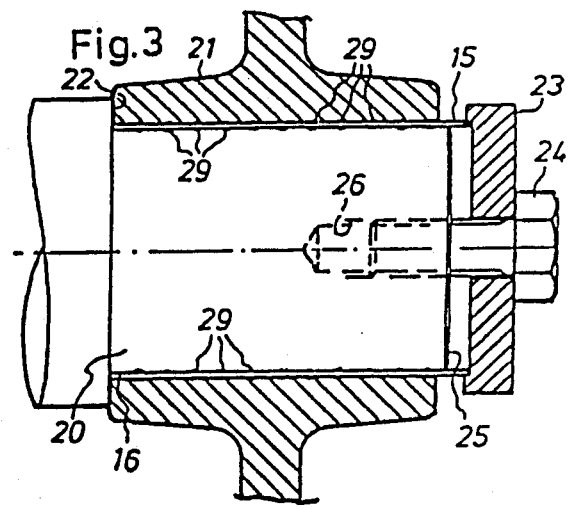
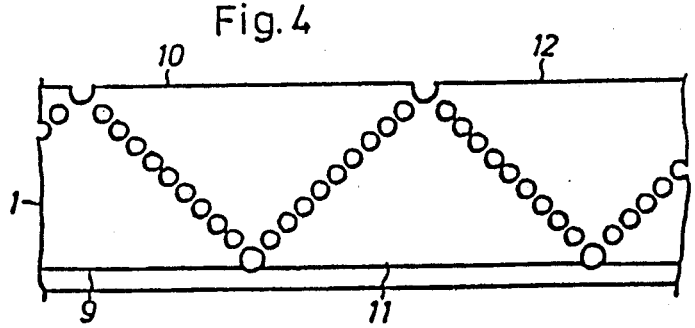
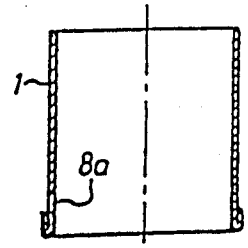

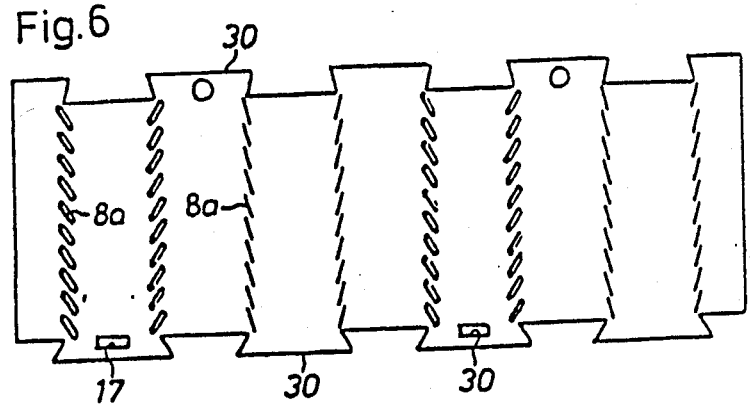
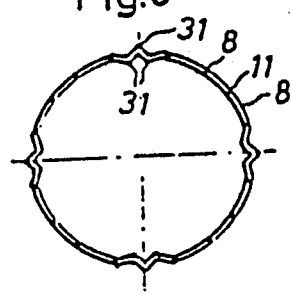
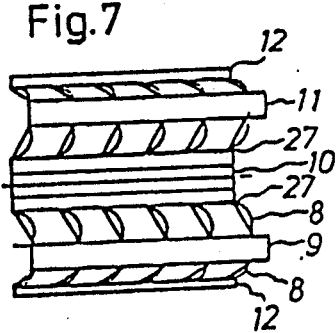
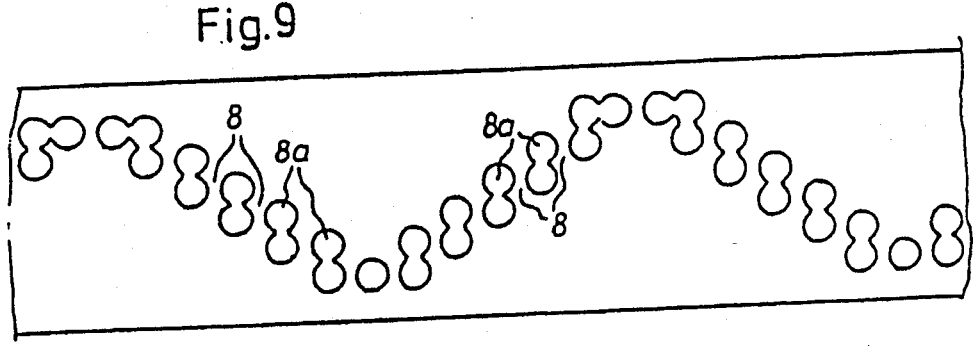
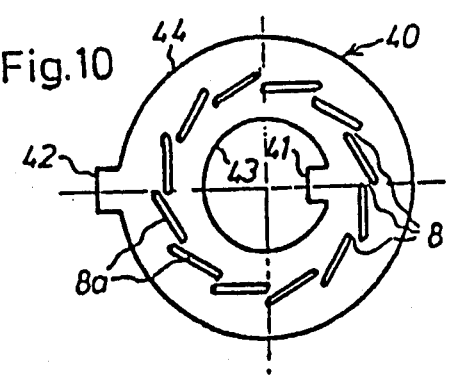

DEVICE FOR THE PRODUCTION OF A LOCKING OR BRAKING EFFECT BETWEEN TWO ELEMENTS

BACKGROUND OF THE INVENTION

The present invention relates to a device for the production of a locking or braking effect between two elements whose surfaces face each other, and between which surfaces the device is designed to be inserted and manoeuvred into a position which produces the said locking or braking effect. Such elements can, for example, comprise a shaft and a hub liner with concentric cylindrical surfaces, between which it is desired to form a friction joint and/or shear strain, or a controlled braking effect.

The invention relates generally to that area of engineering which includes torque bushes, clamping bushes, shaft couplings, friction couplings and the like.

Among mounting connections and devices for torque and load transmission between, for example, a shaft and a hub which are currently available, there are shrink-fit joints, which are produced by the heating and/or cooling of surfaces and components which have been machined to fine tolerances in advance. There are also keyway or spline joints, tapered clamping bushes and expanding clamping sleeves of various kinds, as well as hydraulically activated connections and such connections achieved with capillary-creeping, self-hardening adhesive.

SUMMARY OF THE INVENTION

There are a number of demands and requirements upon connecting devices within the above-mentioned area of technology. A primary demand with regard to shaft connections is that the connection should transmit as much torque or load as possible in relation to the shaft dimension. The outer and inner diameters of the hub should also be as small as possible in relation to the size of the shaft, and, where possible, the stress produced upon the shaft and the hub should be uniform. In this way, the minimum external dimensions and the lowest weight are achieved. An important aspect is the requirement for a uniform distribution of pressure over relatively large areas of the joint. Further, the demands upon both the dimensional and positional tolerances and the surface fineness of the machine components should be moderate. Costly machining of keyways, cones, shoulders and holes for stop bolts etc. should be avoided. Mounting of the locking device should be carried out quickly and easily without special tools or any specialist knowledge of the handling of the device. Nor especially should mounting result in any positional shift of the machine parts which are to be connected to the device. A requirement is thus, that the frictional drag and surface pressure etc. which arise during the locking fast of the device should, to as small degree as possible, limit the manoeuvrability of the device during mounting and locking. The locking effect of the device should, further, not be affected by external loads, whatever their direction. Nor should there be any significant sensitivity to high or low temperatures, ageing or any normal stresses and strains. It is, in addition, an advantage if the setting or locking position of the device can be checked from outside the device. Finally, a satisfactory locking device should be able to be removed easily in order to free the previously connected components.

Despite the above demands and requirements, the device should also be cheap and economical with resources, even if the device ought, for non-corrosive purposes, to be produced from a high-grade, corrosion-resistant material. The object of the invention is to produce a device which fulfils all of the above demands and requirements, and this object is achieved by a device, the characteristics of which are given in the appended patent claims.

BRIEF DESCRIPTION OF THE DRAWINGS

The invention will now be more close y described with design examples and with reference to the appended drawings, of which FIG. 1 is a plan view of an outspread sleeve wall which is part of a locking bush designed in accordance with the invention, FIG. 2 is an end view of the locking bush and FIG. 3 shows the locking bush in FIGS. 1 and 2 mounted between a shaft and a hub. FIG. 4 is a plan view of an outspread sleeve wall which is part of a second design of a locking bush according to the invention. FIG. 5 is a longitudinal section of the locking bush according to the second design. FIG. 6 is a plan view of an outspread sleeve wall which is part of a third design of locking bush according to the invention. FIG. 7 is a plan view of an outspread sleeve wall which is part of a fourth design of locking bush according to the invention. FIG. 8 is a cross section of the locking bush according to the fourth design. FIG. 9 shows a design variant of the invention formed as a locking plate. FIG. 10 is another design operated by turning in the form of a friction washer. FIG. 11 shows a section of the device of FIG. 10.

DESCRIPTION OF THE PREFERRED EMBODIMENTS

A first design of the invention and its use can be seen in FIGS. 1-3. The device according to this design can be made from either a thin-walled, calibrated tube or a metal strip (FIG. 1), which has been worked and formed into a sleeve. In the body surface 1 of the sleeve are arranged rows 2-7 of compressive, bending and tensile load-absorbing bridges 8, which are punched out and partially freed from the body surface 1 with holes 8a on either side. The rows 2-7 extend along substantially the entire length of the sleeve and are, at least partially, orientated in its longitudinal direction. As is evident from FIG. 1, the said bridges 8 connect continuous sections 9-14 of the sleeve's body wall 1. The sleeve wall 1 is further provided with cross members 15,16 at the ends of the sleeve. These cross members are so arranged in the design shown that the lower cross members 15 connect the odd-numbered sleeve sections, i.e. sections 9,11 and 13, while the upper cross members 16 connect the even-numbered sleeve sections, i.e. sections 10,12 and 14. Through the arrangement of the said rows of bridges 8 and holes, the cross members 15,16 and the sleeve sections connected thereto, may be displaced relative to each other either axially and/or circumferentially. Sleeve sections 9-14 are curtailed at their free ends by long slots 9a-14a which extend circumferentially. The purpose of these slots is to act as a stop upon the axial displacement of sleeve sections 9,11 and 13 to sleeve sections 10,12 and 14. The body wall is also provided with grip holes 17 in order to remove the device.

FIG. 3, which shows the method of use for the sleeve shown outspread in FIG. 1, shows thus the sleeve inserted between the two concentric cylindrical surfaces of a shaft 20 and a hub 21. One end of the sleeve, the end at which cross members 16 are, rests against a shoulder 22 formed on the shaft 20. The other end of the sleeve, i.e. the end where cross members 15 are, rests against a tightening plate 23, through which there is a central tightening bolt 24, which is in engagement with a threaded hole 26 in the end 25 of the shaft 20.

The sleeve is initially inserted in its original condition in the space between the said concentric surfaces, after which the tightening plate 23 and the bolt 24 are applied to the end of the shaft 25. The thickness of the sleeve is such that it substantially corresponds to the radial play between the shaft 20 and the hub 21. In order to achieve the desired locking or braking effect between the shaft 20 and the hub 21, the plate 23 is drawn to the left in FIG. 3 by tightening the bolt 24. Sleeve sections 9,11 and 13 will then be displaced axially in relation to sections 10,12 and 14, in the direction of the shoulder 22. The shoulder 22 prevents the displacement of the inner sleeve sections 10,12 and 14 in relation to the shaft 20 and the hub 21 during the locking procedure.

In the following, sleeve sections 9,11 and 13 are generally termed the working sections, while sections 10, 12 and 14 are generally termed the contact sections.

In order to achieve the desired locking or braking effect between the shaft 20 and the hub 21, the body wall is provided with weak zones connected with the contact sections. In the design shown in FIGS. 1–3, these coincide with the bridge ends 27, which connect the bridges 8 with the contact sections 10,12 and 14. For this purpose, the bridge ends 27 are narrower in the plane of the body wall 1 transverse to the long direction of the bridges 8 than the corresponding bridge ends 28 opposite, which connect the bridges 8 to the working sections 9,11 and 13.

When the tightening plate 23 is tightened towards the shoulder 22, compressive forces will arise in the bridges 8. These compressive forces result in a material swelling of the bridge ends 27 of reduced width, whereby the material in the bridge ends is compressed into a smaller area. In this way a number of pressure points 29 are formed, which project radially inwards and outwards against the said concentric surfaces. This material swelling may also occur in other areas of the body section, but will first and foremost occur in those parts of the body surface where the specific stresses are greatest, i.e., in this design, at the bridge ends 27.

In order that the best effect, with reference to the above stated demands and requirements, is to be maintained throughout the entire locking process, then the pressure points or pressure surfaces 29 should be set up in the device in such a way that they do not to any significant degree change their position relative to the components they press against, or relative to the stationary contact sections. A positional change of the pressure points could otherwise prevent, after a certain degree of expansion and locking has been achieved, any further locking operations, and thereby limit the locking effect of the device. It is therefore suitable that the bridge ends 28 connected to the working sections 9,11 and 13 are of reduced thickness in comparison with the other parts of the body wall 1, so that these bridge ends 28 do not form pressure points during the locking process. Where great tightening pressure is applied to the tightening plate 23, then pressure points will, naturally, occur at other places than the said bridge ends 27 of reduced width.

FIGS. 4 and 5 show a simpler design, where the bridges 8 and the bridge ends 27 and 28, in principle, coincide, the holes 8a having been formed as circular openings in the body wall 1. In order that the pressure points 29 do not shift to any appreciable degree during the locking procedure and thereby prevent further locking, the grouping of these is such that each row of holes and bridges is inclined in relation to the longitudinal direction of the sleeve.

In FIG. 6, which shows a third design of the locking bush according to the invention, the holes 8a are formed as long, slanting openings, cuts or laser-cut slots, and the body 1 is provided at both ends of the sleeve with dovetail-shaped portions 30 or holes 17, which form fastening points for dismounting tools or the like, and with which the sleeve sections can be displaced axially for the removal of the sleeve. As is evident in FIG. 6, cross members 15 and 16 are not necessary for its function, and these cross members are therefore not included in the design according to FIG. 6.

In a special design form of the invention, a multilinear contact is achieved, unlike the multi-point contact with adjacent surfaces described above. Such a variant is shown in FIGS. 7 and 8, in which the bridges 8 are elongated and slanted in relation to the axial direction of the sleeve, and are very flexibly connected to the sleeve sections. The contact sections, called 10 and 12 in FIG. 7, and which are designed to rest against a shoulder 22 or the like on the shaft, do not undergo any axial or radial displacement during the locking process. They are therefore corrugated or wave-shaped parallel to the longitudinal direction, between the joints or connecting points 27 of the bridges 8, with one or more waves or raised ridges 31. When a compressive load is applied to the displaceable working sections, 9 and 11 in FIG. 7, the buckle-resistant bridges 8 will turn in the direction of a more transverse position in relation to the axial direction of the device, while a gradually increasing compressive strain will arise in both the bridges 8 and the corrugated or wave-shaped body sections 10,12. These circumferential compressive forces result in a compressive effect upon the wave-shaped sections, which start to collapse and expand, thus, radially inwards and outwards with a resultant locking or braking effect upon the adjacent surfaces of the machine components.

FIG. 9 shows a variant in which the rows of holes and bridges are inclined and where alternate rows are inclined in opposite directions in relation to the axial direction of the sleeve. The holes are here so formed that the bridges are orientated axially. Upon the compression of the sleeve, the bridges will be directly affected by the axially directed forces on the sleeve, and will thereby achieve the desired locking effect.

It is, of course, also possible to apply the device according to the invention to a spherical or conical surface, as well as to a flat one. It is also possible to construct a device in accordance with the invention in which the locking or braking effect is achieved by a turning operation, instead of compression or tension. A design of such a device, operated by turning, is shown in FIG. 10 in the form of a friction washer 40 with variable locking function. By the use of tongues 41,42, both inner 43 and outer 44 concentric surfaces can, upon the application of torque, be made to assume varying turned positions in relation to each other. One or more rows of slots 8a and bridges 8 can, if arranged according to the concept of the invention described above, by the relative turning of the inner 40 and outer 43 parts of the disc, produce a number of pressure and friction points projecting at right angles to the disc, which are designed to hinder or prevent displacement between adjacent machine components or the like, between which the disc 40 has been employed in the locked position. FIG. 11 shows a section of the device of FIG. 10 inserted and clamped between two parallel surfaces of two bodies, corresponding to the elements 20 and 21 of FIG. 3.

Removal of the device according to the invention is carried out by the reverse procedure to that of mounting. Thus, instead of compression, in those cases where the device is designed as a bush, oppositely directed tensile forces are applied to each end of the sleeve in order to part the contact sections and the working sections from each other. Parts 29 which have been compressed and have therefore expanded in thickness at right angles to the surface of the body wall 1, will, upon the reversal of the direction of the forces, be stretched and thinned out for the removal of the device. For this purpose, it is suitable for the devices according to the invention to be provided with grip holes, slots (reference number 17), collars, threads or flanges, at least at the only accessible operating end. It should be noted especially that no holdfast is required at the other end, since the device will be removed in its entirety upon the application of a sufficiently large pulling force on the free or outer operating end.

In the production of devices according to the invention, many different materials may be used, for example, metal strip, tubes, bars, powder or polymer material, injection-moulded or pressed to the desired form, as well as pressed and/or sintered powder material.

For the distribution and/or evening-out of pressure against the components adjacent to the device, it can be an advantage to provide the device with an internal and external lining or casing of suitable thickness and material, which is designed to distribute the loads from the pressure points 29/pressure lines 31 over larger surface areas.

Further, it is not necessary for the bridges and/or the bridge ends to be whole or unbroken in direct contact with the adjacent material sections. One or more of these bridges may be cut off or broken and yet still, through the application of the concept of the invention, achieve the intended effect. The number, shape and attitude of the bridges/bridge ends can, in addition, vary in accordance with the construction and purpose of the device, whilst retaining the essential nature of the invention.

It is not only the body sections which can be corrugated or wave-shaped in order to achieve a stepping up of compressive or operating forces. A good effect can also be attained if the bridges shown in FIG. 6 are elongated by a greater overlapping between adjacent cuts or slots. With such a form, the bridges may be corrugated, so that their orientation almost coincides with the direction of compression of the sleeve.

It should be noted especially that the compressive effect which according to the invention, occurs in the bridges/bridge ends, does not only result in expansion in a radial direction, but also produces forces directed circumferentially in the entire sleeve. These circumferentially produced forces can in themselves be exploited for a direct locking function or indirectly through folds or the like in the body of the sleeve.

The function of the device can in general be explained in the following terms. The many pressure points which engage the surrounding surfaces, for example, a hub and a shaft, exert a high specific pressure. The locking effect against displacement forces from outside is a product of this pressure and the frictional coefficient of the material in question. A locking effect, however, is also obtained from the indentations which occur in the surrounding material and the shear forces thereby created. This shear force resistance from the points can prevent bearing ring movement on the shaft, which is otherwise difficult to control.

It is therefore clear that the designs which have been shown and described cannot in any way be considered as a limit to the patent protection sought, this being only limited by the following patent claims.

I claim:

1. A radially deformable device for counteracting relative movement between two elements, such as a shaft and a hub, displaying two concentric surfaces along a center axis, said device comprising
    a one-piece cylindrical sleeve extending along the center axis thereof, for axial insertion between the two surfaces;
    said sleeve divided into sleeve sections, at least some of which are connected to each other at least by bridges integral with said sleeve;
    said sleeve sections circumferentially separated from each other by at least partially axially directed rows of through-holes formed in said sleeve with said through-holes projecting radially all the way through said sleeve from an outer peripheral surface of said sleeve to an inner peripheral surface of said sleeve and extending substantially along the major portion of the length of said sleeve;
    each of said sleeve sections arranged at a substantially equally radial distance from the center axis;
    said bridges defined between adjacent through-holes in each of said rows of through-holes with end points of each of said bridges located at substantially the same radial distance from the center axis whereby said bridges are subjected to substantially only non-radially directed forces;
    said sleeve further provided with weak zones which are operatively connected to said bridges, with said weak zones before compression having a radial thickness which is substantially equal to the radial thickness of each of said sleeve sections, and each said weak zones designed to be, through compression thereof in a direction projecting within radially inner and outer boundaries of said sleeve, expanded radially inwards and outwards into engagement with said two surfaces to counteract relative movement between the two elements;
    and said sleeve sections designed to be, upon axial compression of said sleeve, axially displaced in relation to circumferentially adjacent sleeve sections in order to produce compressive forces upon said bridges which thereby undergo such movement that compression forces producing said compression of said weak zones are produced in said sleeve.

2. A device according to claim 1, wherein the bridges, prior to any tightening, extend at such an angle to said axis that opposing bridge ends of each bridge are displaced axially in relation to each other and wherein circumferentially adjacent sleeve sections are designed to be displaced in relation to each other in a direction which increases the angle of the bridges to said axis.

3. A device according to claim 2, wherein said rows of through-holes are parallel with said axis and extend along substantially an entire length of the sleeve.

4. A device according to claim 2, wherein said bridges are so inclined that bridges defined by through-holes of a specific row are substantially parallel to each other, and wherein said bridges in adjacent rows of through-holes are inclined in opposite directions relative to said axis.

5. A device according to claim 1, wherein said sleeve sections comprise, along the circumference, alternately contact sections and working sections, said weak zones are sited to conjoin with said contact sections, and wherein the contact sections are designed to be, at a first end of the sleeve, brought initially to rest axially against an abutment in order to prevent displacement of the contact sections in relation to said two surfaces during the axial compression of the device, during which the working sections are displaced axially in relation to the adjacent contact sections in the direction of said first end by the application of compressive force upon a second end of the sleeve.

6. A device according to claim 5, wherein said weak zones are coincident with the ends conjoined to the contact sections, and wherein said bridge ends are of lesser width transverse to the longitudinal direction of the bridges as compared to the bridge ends conjoined to the working sections.

7. A device according to claim 6, wherein the bridge ends conjoined to the working sections have a reduced radial thickness in order to prevent a formation of engagement points at said bridge ends of reduced thickness.

8. A device according to claim 1, wherein said weak zones are coincident with the bridges which during said compression of the weak zones undergo a change of form radially against said surfaces in order to engage them.

9. A device according to claim 1, wherein said weak zones comprise bent portions of the sleeve which are designed to be, during axial compression of the sleeve, subjected to said compressive forces caused by a movement of the bridges and a resulting circumferential expansion of adjacent sleeve section.

10. A device for counteracting relative movement between two elements displaying two substantially planar and parallel surfaces at a predetermined distance from each other, said device comprising
- a one-piece disc-shaped body having a thickness substantially equal to the predetermined distance between the planar and parallel surfaces and being adapted for insertion between the two surfaces;
- said body divided into adjacent sections radially displayed from each other, at least parts of said sections connected to each other by bridges forming part of said body;
- a row of through-holes formed in said body between a pair of said adjacent sections connected by said bridges with said through-holes projecting all the way through said body and extending substantially in a circular row substantially around said body between said adjacent sections;
- said bridges defined between adjacent ones of said through-holes in a row of said through-holes, with said bridges having end points each of which are located at substantially the same radial distance from a center axis of said body;
- said body further provided with weak zones which are operatively connected to said bridges and each of which is designed to be, through compression thereof in a direction parallel to said body, expanded outwards on both sides of said body into engagement with two planar and parallel surfaces of the two elements, with said weak zones before compression having a thickness substantially equal to said thickness of said body;
- and said adjacent sections, after insertion of said body between the two surfaces, designed to be displaced in relation to each other in order to produce compressive forces upon said bridges which thereby undergo such movement that compression forces producing said compression of said weak zones are produced in said body.

* * * * *